United States Patent [19]

Berkey

[11] Patent Number: 4,917,718

[45] Date of Patent: Apr. 17, 1990

[54] METHOD OF MAKING CAPILLARY TUBE

[75] Inventor: George E. Berkey, Pine City, N.Y.

[73] Assignee: Corning Incorporated, Corning, N.Y.

[21] Appl. No.: 270,620

[22] Filed: Nov. 14, 1988

Related U.S. Application Data

[62] Division of Ser. No. 82,680, Aug. 7, 1987, Pat. No. 4,822,389.

[51] Int. Cl.$^4$ .................. C03B 37/022; C03B 37/018; C03B 23/04

[52] U.S. Cl. ...................................... 65/108; 65/3.12; 65/87; 427/163

[58] Field of Search ..................... 65/2, 3.11, 3.12, 64, 65/87, 102, 108, 109, 110; 427/163

[56] References Cited

U.S. PATENT DOCUMENTS

| | | | |
|---|---|---|---|
| 3,652,248 | 3/1972 | Loxley et al. | 65/108 |
| 3,775,075 | 11/1973 | Keck et al. | 65/3.12 |
| 3,823,995 | 7/1974 | Carpenter | 65/3.12 X |
| 3,897,233 | 7/1975 | Szilagyi | 65/109 |
| 3,907,536 | 9/1975 | Achener | 65/60 |
| 4,121,919 | 10/1978 | Le Sergeant et al. | 65/3.12 |
| 4,525,192 | 6/1985 | Booms | 65/110 |
| 4,578,101 | 3/1986 | Clark et al. | 65/108 X |

FOREIGN PATENT DOCUMENTS 58-045131  3/1983  Japan ..................... 65/3.12

*Primary Examiner*—Robert L. Lindsay
*Attorney, Agent, or Firm*—William J. Simmons

[57] ABSTRACT

A method of making a thick walled glass tube by depositing glass particles on the surface of a glass tube, sintering the particles, and drawing the resultant structure to form a capillary tube having a predetermined desired inside diameter.

10 Claims, 2 Drawing Sheets

METHOD OF MAKING CAPILLARY TUBE

This application is a divisional application of co-pending application Ser. No. 082,680, filed on Aug. 7, 1987, now U.S. Pat. No. 4,822,389, granted Apr. 18, 1989.

BACKGROUND OF THE INVENTION

The present invention relates to capillary splices for optical fibers, the method of making such splices, and the method of splicing optical fibers together; and more particularly to an economic method of making capillary splices for optical fibers and the resulting article.

Optical fibers, such as optical waveguides, have a glass core and a cladding surrounding the core having a refractive index less than that of the core material. Some optical fiber systems require splices such that at least a portion of the energy propagating in one fiber may be transmitted to at least one other fiber.

Optical fibers may be single-mode where the core diameter is of just one or a few microns or multi-mode fibers having core diameters significantly larger.

An elastomeric fiber optic splice is described in U.S. Pat. No. 4,257,674. This fiber optic splice has a fiber receiving member formed in a pair of sections such that, when assembled, it provides an external polygonal shaped surface. These sections have complimentary and mating planar surfaces in engagement with one another. One of the planar surfaces has an axially aligned V-shaped groove formed therein facing the other of the planar surfaces thereby forming an opening therebetween. The fiber receiving member is formed of an elastomeric material of sufficient resilience to permit the groove opening to expandably receive optical fibers dimensioned larger than the opening. A cylindrically shaped sleeve is disposed about the elastomeric receiving member surrounding the polygonal shaped surface and holding the two sections of the member in an assembled relationship. As fibers are inserted into the groove, they are maintained in place by the resilient properties of the two piece elastomer member.

Another optical fiber splice is the Norland self aligning UV curable splice and the Lightlinker fiber optic splice system. These splices include a central glass alignment guide composed of four tiny glass rods which have been fused together to provide a hollow core containing four V-grooves at the fused tangential points. The ends of the guide are bent somewhat along the longitudinal axis. This forms a fiber deflecting elbow on either side of a straight central portion of the guide. When fibers are inserted into the guide, the upward or downward slope of the ends forces the fibers to orient themselves in the uppermost or lowermost V-grooves of the guide, respectively. When the fibers meet at the center portion, they are both tangent to the guide surfaces so that the ends thereof abut each other. The splice is used by first filling the central opening with a UV curing optical adhesive. After the fibers are prepared by stripping any exterior resin coating and squaring of the ends, they are inserted into the splice so as to be aligned when they contact each other. Exposure to UV light cures the adhesive encapsulating the fiber providing handling strength.

Some of the problems and disadvantages with prior art splices are the complexity and cost thereof. Such splices require assembling various components and fusing them together. Alternatively, the splices are made of elastomeric material which may be less stable chemically and has a high expansion. Prior art splices are simply more complicated to assemble, use and manufacture. In addition, many of the prior art fabrication steps are highly labor intensive and, therefore, add greatly to the cost of the splice.

For teaching of forming optical waveguides or other optical fibers reference is hereby made to U.S. Pat. Nos. 3,659,915 to R. D. Maurer and P. C. Schultz, 3,711,262 to D. B. Keck and P. C. Schultz, 3,737,292 to D. B. Keck, P. C. Schultz and F. Zimar, 3,737,293 to R. D. Maurer, 3,775,075 to D. B. Keck and R. D. Maurer, 3,806,570 to J. S. Flamenbaum, P. C. Schultz, and F. W. Voorhees, 3,859,073 to P. C. Schultz, and 3,884,550 to R. D. Maurer and P. C. Schultz.

SUMMARY OF THE INVENTION

An object of the invention is to provide an improved method of making a thick walled glass capillary tube having a small inside diameter.

Briefly the method of the invention comprises providing a glass tube having an inside diameter greater than the desired inside diameter. Partriculate glass material is applied to the outside peripheral surface of the tube to form an adherent porous coating. The porous coating is sintered to consolidate drawn to form a thick walled glass capillary tube having a predetermined desired inside diameter.

These and additional objects, features and advantages of the present invention will become apparent to those skilled in the art from the following detailed description and the accompanying drawing, which is incorporated and constitutes part of the present specification, on which, by way of example, only the preferred embodiments of this invention are illustrated.

DESCRIPTION OF THE PREFERRED EMBODIMENTS

It is to be noted that the drawings are illustrative and symbolic of the present invention and there is no intention to indicate scale or relative proportions of the elements shown therein.

Figure 1:
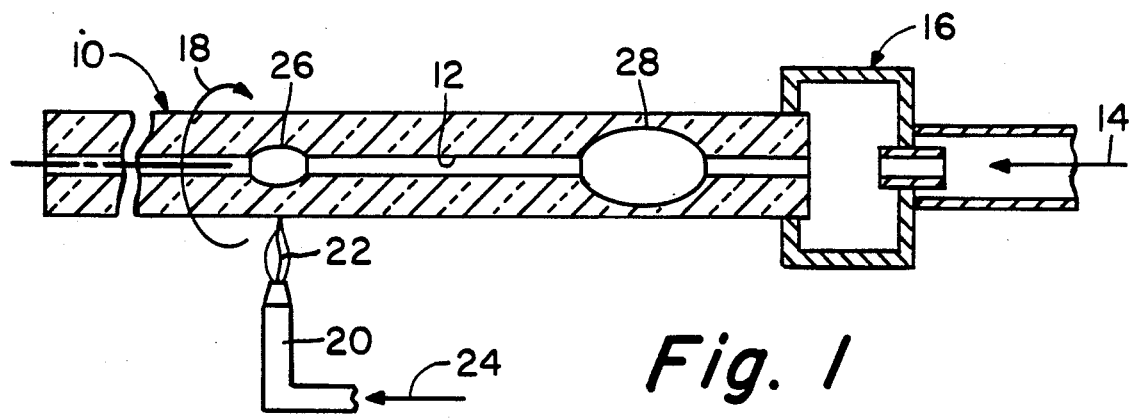
FIG. 1 is a cross-sectional elevation of an apparatus illustrating a method in accordance with the present invention.

Referring to FIG. 1, there is provided a hollow glass cylindrical member 10. Although the preferred glass is silica, any workable and stable glass may be used as the material for member 10. A longitudinal aperture or bore 12 is provided along the longitudinal axis of hollow cylindrical member 10. In particular, hollow cylindrical member 10 may comprise a capillary tube. Longitudinal aperture or bore 12 is placed under pressure by providing a fluid represented by arrow 14, to the bore. Examples of suitable fluids are air, nitrogen, and the like. The fluid may be provided to aperture or bore 12 by means of a rotating union 16 well known in the art. As will be understood, any means known in the art for connecting a source of fluid to a rotating member may be suitable for use in the present invention. The fluid pressure within the longitudinal aperture or bore 12 must, of course, be in excess of the ambient pressure. Pressures of up to about 30 PSIG have been used but higher pressures may also be used.

Cylindrical member 10 is rotated as illustrated by arrow 18 about its longitudinal axis. Any suitable means for rotating hollow cylindrical member 10 is suitable for the present purposes, and is not shown since such means are well known in the art. An example of suitable rotating means is a glass working lathe. As cylindrical member 10 is so rotated, a portion thereof is locally heated by means of burner 20 and flame 22 to the softening point of the glass cylindrical member 10. Fuel is provided to burner 20 as illustrated by arrow 24. As will be understood, any heating means which can provide localized heating is suitable for the present purposes in place of burner 20. Examples of which are a resistance heater, induction heater, and the like. Such localized heating means are well known in the art.

As a portion of the cylindrical member 10 is heated to the softening point of the glass by means of burner 20 or the like, the inside wall of aperture or bore 12 is caused to expand within the softened area by pressure of the fluid within aperture or bore 12. Such an expansion will cause a bubble 26 to begin forming therewithin. As will be understood, a temperature gradient will result from the localized heating such that the material of glass cylindrical member 10 in the vicinity of the centerline of flame 22 will become least viscous causing the bubble to have the greatest expansion and accordingly the greatest inside diameter and tapering therefrom in each direction to merge with the aperture or bore 12 at a point where the temperature of the glass is at the softening point thereof. As the cylindrical member 10 is rotated and subjected to localized heating, the bubble will continue to expand to a degree such that the maximum diameter of the bubble comprises a major portion of the diameter of cylindrical member 10 as illustrated by bubble 28. It has been found that although material is displaced in the formation of bubble 28 the outside diameter of cylindrical member 10 increases only slightly in the vicinity of the bubble and the resulting product may be made from the cylindrical member formed in this manner. However, if it is desired to have the outside diameter in the vicinity of the bubble the same as or slightly less than the outside diameter of the cylindrical member, the diameter increase in the vicinity of the bubble may be eliminated by applying a force to the cylindrical member along the longitudinal axis thereof while the bubble is being formed. In this manner the cylindrical member is subjected to a drawing or pulling force which will affect the cylindrical member in the area where the glass material is at or above the softening temperature, namely in the vicinity of the bubble formation, thereby eliminating any diameter increase. As elsewhere noted herein, drawing is well known in the art.

The preceding steps may be repeated at intervals along the length of cylindrical member 10 thereby resulting in a hollow cylindrical member 10 having bubbles 28 formed at desired intervals within bore 12 along the length of member 10. As will be understood, rotating the cylindrical member as described will permit more uniform heating, thereof, and a more uniform and concentric resulting bubble. However, rotation is not required if a less uniform and concentric bubble is satisfactory for a specific purpose.

Figure 2:
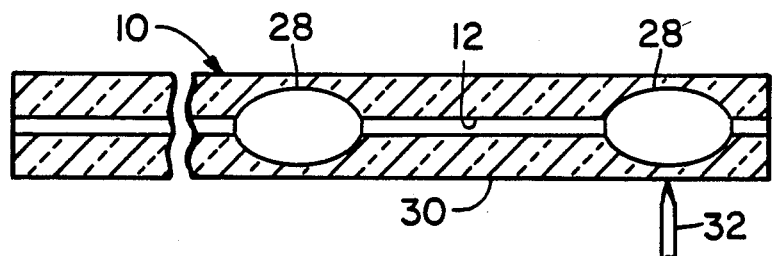
FIG. 2 is a cross-sectional elevation of a hollow cylindrical member being scored at a bubble formed therein.

Referring additionally to FIG. 2, after bubbles 28 are formed within member 10, member 10 is scored along its exterior surface at about the center of each of said bubbles 28 by scoring means 32, as shown. As will be understood, means for scoring glass are well known in the art.

Figure 3:
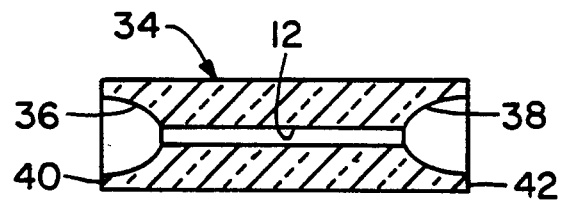
FIG. 3 is a cross-sectional view of a completed splice in accordance with the present invention.

Thereafter, member 10 is severed along each score line to produce one or more splices 34. Referring additionally to FIG. 3, there is illustrated a splice 34 comprising a portion of hollow cylindrical member 10 with its longitudinal bore 12 having tapered apertures 36 and 38 formed at each end of the splice tapered inwardly to merge with bore 12. As is seen, tapered apertures 36 and 38 each comprise a portion of bubbles 28 as illustrated in FIG. 2. Tapered apertures 36 and 38 form funnel-like entrances to bore 12 at end surfaces 40 and 42 of splice 34 respectively. It is important to note that funnels or tapered apertures 36 and 38 are necessary for ease of insertion of a fiber into bore 12 as herein described. Under practical circumstances, bore 12 may be only 2 or a few microns larger than the outside diameter of a stripped fiber, wherefore, insertion thereof into bore 12 would be extremely difficult without tapered apertures 36 and 38.

To facilitate proper fiber splicing, the diameter of bore 12 of splice 34 must be less than two times the outside diameter of the fiber and generally is only one or a few microns larger than the outside diameter of the fiber. As well be understood, if the diameter of bore 12 is greater than two times the outside diameter of the fiber, the fibers may be inserted in bore 12 such that they may pass by one another rather than have the ends thereof abut each other. To achieve the proper diameter of bore 12, the hollow cylindrical member 10 as illustrated in FIGS. 1 and 2 may be drawn by drawing techniques well known in the glass art. In this manner, member 10 may be drawn to achieve the desired proper bore diameter before the splice is formed.

Figure 4:
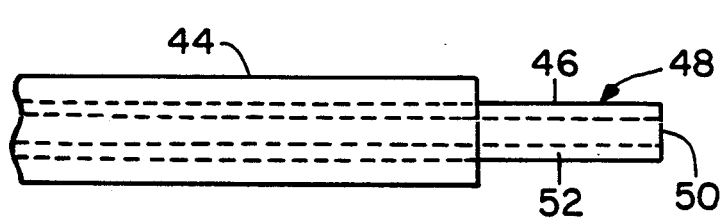
FIG. 4 is a front elevation of an optical fiber having a portion of the resin coating removed therefrom.
Figure 5:
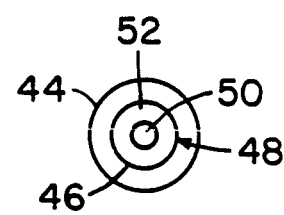
FIG. 5 is an end elevation of the fiber of FIG. 4.

Referring additionally to FIGS. 4 and 5, most fibers have a resin coating 44 on the exterior thereof to protect exterior surface 46 of optical fiber 48. Optical fiber 48 comprises core 50 and cladding 52. A preferred method of coupling such fibers necessitates the removal of resin coating 44 from the exterior of fiber 48 for at least that portion of its length which will be inserted into the bore of splice 34. Removal of resin coating 44 will permit better dimensional control over the fiber resulting in the most efficient coupling between optical fibers. Coating 44 may be removed by mechanical stripping or chemical solvents. An example of a suitable solvent for removing a urethane acrylate resin coating is methylene chloride. Suitable solvents for usable resin coatings are known in the art.

Figure 6:
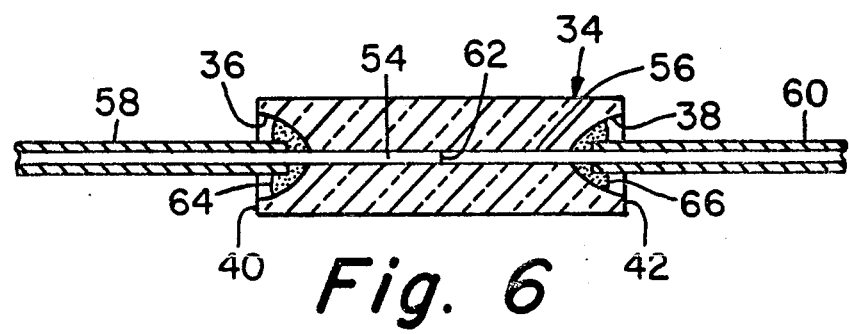
FIG. 6 is a cross-sectional view of a pair of fibers connected together by the splice of the present invention.
Figures 7, 8:
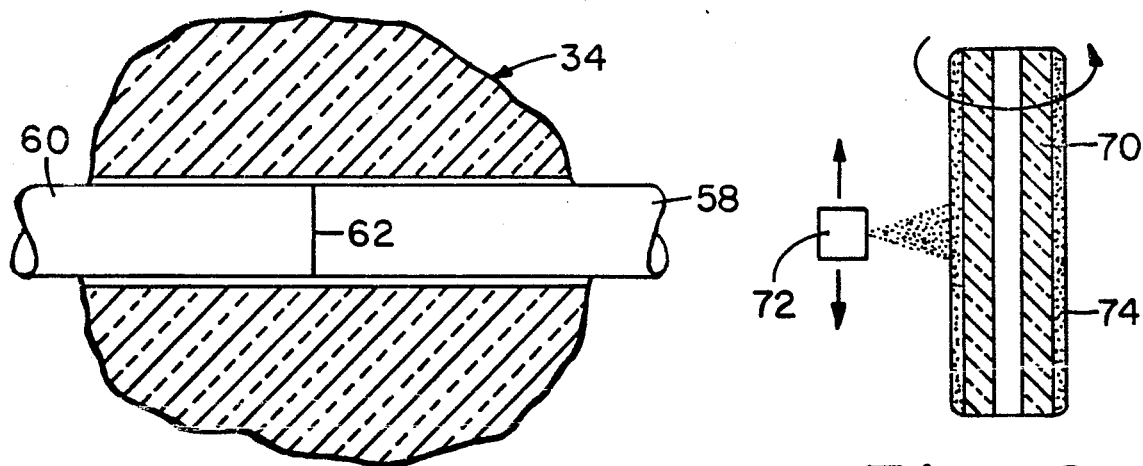
FIG. 7 is an enlarged view of the fiber ends joined in the splice of FIG. 6.
FIG. 8 shows applying particulate glass material on a tube.

Thereafter, the uncoated portions 54 and 56 of coated fibers 58 and 60 are inserted into tapered apertures 36 and 38 respectively at each end of splice 34 until they meet intermediate the end surfaces 40 and 42 of said splice as illustrated by reference numeral 62 shown in FIGS. 6 and 7. A quantity of adhesive or cement 64 and 66 is then disposed in apertures 36 and 38 respectively surrounding the extending fibers so as to permit the fibers to be affixed to splice 34 while the ends of fibers 58 and 60 meet intermediate the ends of splice 34 as shown by reference numeral 62. After adhesive or cement 64 and 66 is cured, fibers 58 and 60 remain rigidly attached to splice 34 with the ends thereof abutting each other intermediate the ends of the splice.

To facilitate better light transmission from one fiber to the other, the bare fiber ends may be dipped in an optical oil, not shown, before inserting them into the splice to increase the light transmission efficiency from one fiber to the other. Such optical oil may be silicone oil or silicone grease as is well known in the art.

A typical example of the present invention is as follows. A 100 cm. length of capillary tubing 70 having an outside diameter of about 3 mm. and an internal bore diameter of 127 μm was mounted in a Litton glass working lathe. The capillary tubing was formed of silica.

Figure 9:
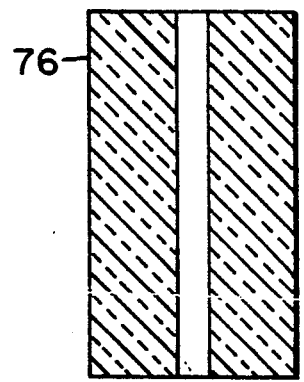
FIG. 9 is a consolidated tube.
Figure 10:
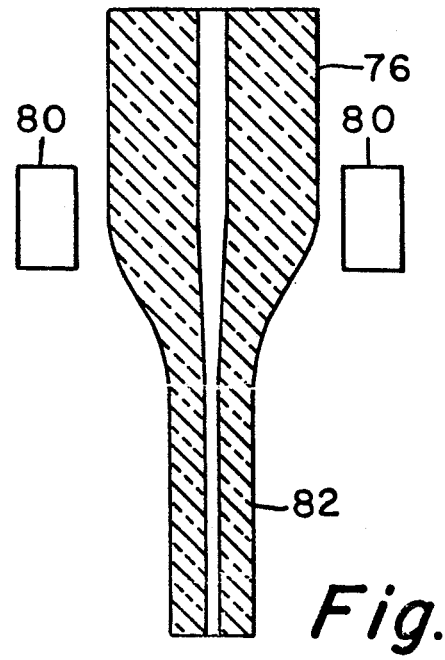
FIG. 10 shows drawing a tube to reduce the diameter.

Such a capillary tubing was prepared by starting with a commercially available silica tube having a 2 mm. inside diameter and a 8 mm. outside diameter. As shown in FIG. 8, the silica tube was then overclad by applying silica soot or silica particles from burner 72 to the outside surface of the tube in a manner described in U.S. Pat. No. 3,775,075, for example. Reference is also made to U.S. Pat. Nos. 4,486,212 and 4,289,517 for teaching of applying or depositing particulate material to an exterior surface of a rod or tube. The particulate silica deposited on the exterior surface of the commercially available silica tube forms a porous coating 74 thereon. When the diameter of the porous coating is approximately 100 mm., the porous portion of the composite so formed is caused to be consolidated by heating and sintering to a solid glass member 76 (FIG. 9) having an outside diameter of about 50 mm. while the inside diameter remains at 2 mm. As shown in FIG. 10, this member is then heated by source 80 to the drawing temperature of 2000° C. and drawn in the manner known in the art until the inside diameter is about 127 μm. At this point in the process the outside diameter is about 3 mm. As will be understood, the original commercial silica tube could not be drawn to the final desired inside diameter because the outside diameter would be only about 508 μm which would render the capillary tubing extremely fragile to handle.

To one end of the capillary tubing 82 was attached a source of air pressure through a rotating union. The rotating union was swivel catalog No. 16-1136 by Wale Apparatus Co. of Allentown, PA.

Starting at the end portion of the capillary tubing opposite from the rotating union, an oxy-gas veriflow hand torch was disposed. The flame from this hand torch or burner was directed to the exterior portion of the capillary tubing while it was rotating in the glass working lathe. The glass capillary tubing was heated in the vicinity of the flame to the softening point temperature of the glass. The air pressure within the bore of the capillary tubing caused a bubble to be formed within the capillary tubing in the vicinity of the gas flame within that portion thereof which was softened by the flame. As will be understood, the inlet air pressure to the capillary tube was about 20 PSIG and decreased along the length thereof since the other end of the tube was open. Sufficient internal pressure was maintained due to the small diameter of the bore. The air pressure was applied to the interior of the capillary tubing and the flame was applied to the exterior of the capillary tubing until a bubble was formed within the bore having a diameter of about 1 mm. Thereafter, the flame was removed and traversed a distance of about 1" where the above process was repeated forming another bubble within the capillary tubing bore. The above process was repeated about 30 times along the length of the capillary tubing wherein bubbles were formed therein at distances of approximately 1 inch.

The capillary tubing was then scored at the approximate location of the center of each of the bubbles formed within the bore by a standard glass tube cutter.

Thereafter, the scored capillary tubing was severed at each score line so as to produce a splice having a body corresponding to the capillary tube and tapered apertures at each end of the member extending inwardly from the end surfaces of the splice to merge with the central bore of the splice.

Two fibers having an outside diameter of 125 μm and a urethane arcylate resin coating were provided. The fibers comprised a core an cladding. The coating was removed from the ends of the fibers for a distance of about 5 inches by means of applying thereto a resin solvent of methalene chloride. The outside diameter of the uncoated fibers was approximately 125 μm. The uncoated ends of the fibers were square cut to a length of about ½ inch using a GTE fiber cutter. The uncoated cut end of one of the fibers was inserted into one of the tapered apertures of the splice so that its end was intermediate the ends of the splice bore. The uncoated cut end of the second fiber was inserted in the other tapered aperture of the splice and into the bore so that it was disposed with its end adjacent the end of the first fiber. A quantity of Norland UV curable glue was disposed in each tapered aperture and cured by exposing it to a UV light to cure for about 1 minute. In this manner, both fibers were rigidly affixed to the splice with the ends thereof abutting each other.

Splice losses measured on such splices for single-mode fibers were typically in the 0.2 to 0.3 db/km. range.

Another example of the present invention resulted by dipping each end of two fibers being joined as described in the preceding example in a silicone optical oil. The fiber ends were then inserted into the splice as described above with a film of the optical oil being present at the point where the fiber ends abutted each other. In repeating the signal transmission as noted in the preceding example, it was found that the losses through this splice were as low as 0.0 db/km.

The present invention has been particularly shown and described with reference to preferred embodiments thereof, however, it will be understood by those skilled in the art that various changes in the form and details may be made therein without departing from the true spirit and scope of the invention as defined by the following claims.

I claim:

1. A method of making a thick walled glass capillary tube having a small inside diameter comprising the steps of
providing a glass tube having an inside diameter greater than the desired inside diameter,
applying particulate glass material to the outside peripheral surface of said tube to form an adherent porous coating, sintering said porous coating to consolidate said glass particles, heating the structure so formed to the drawing temperature of the material thereof, and drawing said structure to a predetermined desired inside diameter.

2. The method of claim 1 wherein the material of said glass tube and said particulate glass is silica.

3. The method of claim 1 wherein the step of applying comprises applying particulate glass having the same composition as said glass tube.

4. The method of claim 1 wherein the step of applying comprises applying said particulate glass in a sufficient thickness that the step of sintering results in an intermediate glass tube, the outside diameter of which is more than twice the outside diameter of said glass tube.

5. The method of claim 1 wherein wherein the step of applying comprises applying particulate glass having the same composition as said glass tube, said particulate glass being applied in a sufficient thickness that the step of sintering results in an intermediate glass tube having (a) an outside diameter which is more than twice the outside diameter of said glass tube and (b) a wall thickness which is more than twice the wall thickness of said glass tube.

6. The method of claim 1 wherein wherein the step of applying comprises applying particulate glass having the same composition as said glass tube, said particulate glass being applied in a sufficient thickness that the step of sintering results in an intermediate glass tube, the wall thickness of which is more than twice the wall thickness of said glass tube.

7. The method of claim 1 wherein wherein the step of applying comprises applying particulate glass in a sufficient thickness that the step of sintering results in an intermediate glass tube having (a) an outside diameter which is more than twice the outside diameter of said glass tube and (b) a wall thickness which is more than twice the wall thickness of said glass tube.

8. A method of making a thick walled glass capillary tube having a small inside diameter comprising the steps of forming an adherent porous coating on the outside peripheral surface of a glass tube having an inside diameter greater than the desired inside diameter by applying particulate glass material thereto, sintering said porous coating to consolidate said particulate glass material, thereby forming an intermediate tube having an outside diameter greater than twice the outside diameter of said glass tube, and a wall thickness which is more than twice the wall thickness of said glass tube.

heating said intermediate tube to the drawing temperature of the material thereof, and drawing said tube to form a thick walled glass capillary tube having a predetermined desired inside diameter.

9. The method of claim 8 wherein the step of forming comprises applying particulate glass having the same composition as said glass tube.

10. The method of claim 8 wherein the step of forming comprises applying silica glass particles to a silica glass tube.

* * * * *